United States Patent
Wong et al.

(10) Patent No.: US 12,135,578 B2
(45) Date of Patent: Nov. 5, 2024

(54) CLOCK DISTRIBUTION CIRCUIT WITH CLOCK TREE CIRCUIT AND FILTER

(71) Applicant: JARIET TECHNOLOGIES, INC., Redondo Beach, CA (US)

(72) Inventors: Ark-Chew Wong, Irvine, CA (US); Richard Dennis Alexander, Lake Forest, CA (US); Clifford N. Duong, Buena Park, CA (US)

(73) Assignee: JARIET TECHNOLOGIES, INC., Redondo Beach, CA (US)

( * ) Notice: Subject to any disclaimer, the term of this patent is extended or adjusted under 35 U.S.C. 154(b) by 0 days.

(21) Appl. No.: 18/099,215

(22) Filed: Jan. 19, 2023

(65) Prior Publication Data
US 2023/0152842 A1    May 18, 2023

Related U.S. Application Data

(63) Continuation of application No. 17/023,198, filed on Sep. 16, 2020, now Pat. No. 11,586,241, which is a
(Continued)

(51) Int. Cl.
| | |
|---|---|
| *G06F 1/04* | (2006.01) |
| *G06F 1/06* | (2006.01) |
| *G06F 1/10* | (2006.01) |
| *G06F 1/12* | (2006.01) |
| *G06F 1/08* | (2006.01) |
| *G06F 1/3203* | (2019.01) |

(52) U.S. Cl.
CPC ............... *G06F 1/10* (2013.01); *G06F 1/04* (2013.01); *G06F 1/06* (2013.01); *G06F 1/12* (2013.01); *G06F 1/08* (2013.01); *G06F 1/3203* (2013.01)

(58) Field of Classification Search
CPC ..... G06F 1/10; G06F 1/04; G06F 1/06; G06F 1/12
USPC ........................................................... 713/500
See application file for complete search history.

(56) References Cited

U.S. PATENT DOCUMENTS 6,011,441 A * 1/2000 Ghoshal ................. G06F 1/10
                                                              327/295
6,073,050 A * 6/2000 Griffith ................. A61N 1/3727
                                                              607/57
(Continued)

OTHER PUBLICATIONS

Extended European Search Report from European Patent Application No. 17753965.7, dated Sep. 4, 2019, 7 pages.

*Primary Examiner* — Volvick Derose
(74) *Attorney, Agent, or Firm* — Morgan, Lewis & Bockius LLP

(57) ABSTRACT

A band-pass clock distribution circuit includes a clock tree circuit including at least one clock buffer circuit. The clock tree circuit may be configured to receive a first clock signal from a clock generator circuit and to generate a second clock signal based on the first clock signal. A band-pass filter may be configured to receive the second clock signal and to provide a third clock signal to one or more load circuits. The band-pass filter includes a filtering resonant network including a first inductor and a second inductor coupled to one another at a center tap. The filtering resonant network is configurable to resonate with a parasitic capacitance associated with the one or more load circuits. A portion of the band-pass filter is integrated with the clock tree circuit.

20 Claims, 7 Drawing Sheets

Related U.S. Application Data continuation of application No. 15/999,339, filed as application No. PCT/US2017/018465 on Feb. 17, 2017, now Pat. No. 10,802,533.

(60) Provisional application No. 62/296,547, filed on Feb. 17, 2016.

(56) References Cited

U.S. PATENT DOCUMENTS

| | | | |
|---|---|---|---|
| 2002/0070768 A1* | 6/2002 | Mar | H03L 7/1974 327/105 |
| 2004/0046596 A1* | 3/2004 | Kaeriyama | H03L 7/0995 327/165 |
| 2004/0046613 A1* | 3/2004 | Wissell | H03H 7/0115 331/46 |
| 2005/0114820 A1* | 5/2005 | Restle | G06F 1/10 327/291 |
| 2006/0202730 A1* | 9/2006 | Murden | G06F 1/04 327/291 |
| 2006/0208832 A1* | 9/2006 | Kamata | H03H 7/0115 333/174 |
| 2014/0002183 A1* | 1/2014 | Iyer | H03F 3/45183 327/564 |
| 2014/0055180 A1* | 2/2014 | Garg | H03K 5/135 327/156 |
| 2014/0062562 A1* | 3/2014 | Sathe | G06F 1/10 327/294 |
| 2014/0210536 A1* | 7/2014 | Kurchuk | H03K 5/1252 327/292 |
| 2014/0333356 A1* | 11/2014 | Aryanfar | G06F 1/10 327/158 |
| 2016/0261256 A1* | 9/2016 | Kawai | H04L 25/03 |
| 2017/0163274 A1* | 6/2017 | Cheng Chang | G06F 1/08 |

* cited by examiner

CLOCK DISTRIBUTION CIRCUIT WITH CLOCK TREE CIRCUIT AND FILTER

CROSS-REFERENCE TO RELATED APPLICATIONS

This application is a continuation of application Ser. No. 17/023,198, filed on Sep. 16, 2020, which is a continuation of application Ser. No. 15/999,339, filed on Aug. 17, 2018, now U.S. Pat. No. 10,802,533, which is the national stage of International Patent Application No. PCT/US2017/018465, filed on Feb. 17, 2017, which claims the benefit of U.S. Provisional Patent Application No. 62/296,547, filed on Feb. 17, 2016, the entirety of each of which is incorporated herein by reference.

TECHNICAL FIELD

The present description relates in general to integrated circuits, and more particularly to, for example, without limitation, band-pass clock distribution networks.

BACKGROUND

Almost all digital and mixed signal systems use clock signals that are distributed throughout the system using one or more clock distribution networks. The main function of a clock distribution network is synchronization of the flow of data signals among a number of synchronous data paths. This makes the clock distribution networks an important part of the system, as the performance and reliability of the system is substantially affected by the operation of the clock distribution networks.

The description provided in the background section should not be assumed to be prior art merely because it is mentioned in or associated with the background section. The background section may include information that describes one or more aspects of the subject technology.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In one or more implementations, a clock distribution network may provide clock signals to a number of circuits, for example, digital-to-analog (DAC) drivers that can present a considerable capacitive input impedance. Such a capacitive input impedance can load the clock distribution network and thus demands a high signal current resulting in high power consumption. Therefore, in one or more implementations, clock distribution networks with improved power consumption and reduced phase noise are desired.

In one or more implementations, the subject technology may allow alleviation of issues related to degradation of phase noise (e.g., jitter) in clock distribution circuits. In one or more aspects, the subject technology allows providing clock signals for a larger load (e.g., capacitive load) using a clock tree circuit with reduced number of buffers and/or or a reduced size of the buffers (e.g., reduced size of transistors that form the buffers). In one or more aspects, the reduction of the number and/or size of the buffers may allow for a reduction in power consumption and phase noise (e.g., jitter) of the clock tree circuit. As used herein, the terms clock distribution networks and clock distribution circuits are used interchangeably.

Figure 1:
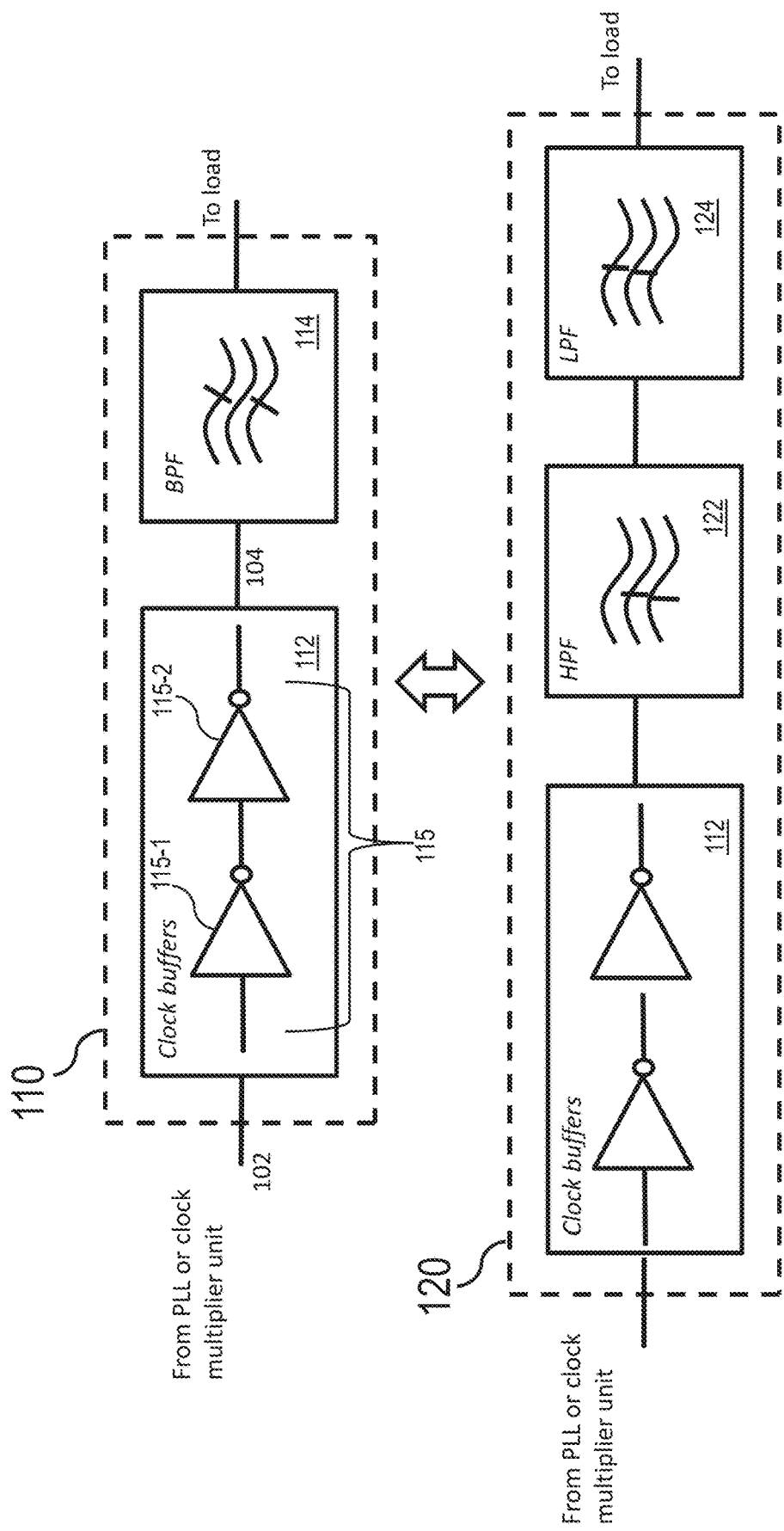
FIG. 1 illustrates examples of band-pass clock distribution networks.

FIG. 1 illustrates examples of band-pass clock distribution networks 110 and 120. The band-pass clock distribution network 110 may include a clock tree circuit 112 and a filtering resonant network 114. The clock tree circuit 112 may include one or more clock buffers 115 (e.g., 115-1 and 115-2). The filtering resonant network 114 may be, may include, or may be a part of a band-pass filter (BPF). The clock buffers 115 may receive a first clock signal 102 and provide a second clock signal 104 to the band-pass filter 114. In an aspect, the clock buffers 115 may receive the first clock signal 102 from a phase-locked loop (PLL) and/or a clock multiplier unit.

The clock buffers 115 may be referred to as a chain or cascade of clock buffers 115 forming the clock tree circuit 112. In some implementations, the clock buffers 115 may be complementary metal-oxide semiconductor (CMOS) inverters. In an aspect, the first clock signal 102 may be a reference clock signal (e.g., a master clock signal generated by the PLL) and used for synchronization and scheduling operations, or a multiple (e.g., integer multiple) of the reference clock signal (e.g., generated by the clock multiplier). The band-pass filter may filter the second clock signal 104 received from the clock tree circuit 112 and provide the filtered clock signal to a load. In an aspect, the load may be a digital-to-analog converter (DAC) driver and/or a transmitter circuit. In some aspect, the load may be multiple DAC driver and/or transmitter circuits coupled as parallel loads to the band-pass clock distribution networks 110.

In an aspect, the band-pass clock distribution network 110 may be, or may be represented as, a band-pass clock distribution network 120. In this regard, the band-pass filter 114 of the band-pass clock distribution network 110 may be decomposed into a high-pass filter (HPF) 122 and a low-pass filter (LPF) 124. The HPF 122 and the LPF 124 may be in a cascade (e.g., series) configuration. In an aspect, the order of the HPF 122 and the LPF 124 may be reversed from that shown in FIG. 1 such that the clock signal from the clock tree circuit 112 is filtered by the LPF 124 prior to being filtered by the HPF 122.

Although the clock buffers 115 of the band-pass clock distribution networks 110 and 120 are illustrated as including inverters, the clock buffers 115 may include clock buffers that do not invert the clock signal. In an aspect, such clock buffers 115 may be referred to as non-inverting buffers or repeaters. As used herein, the terms clock buffers and clock distribution buffers are used interchangeably, and may include non-inverting buffers, inverters, or a combination thereof.

In one or more implementations, a clock distribution network (e.g., the clock distribution networks 110 and 120) may include a T-coil. The T-coil may be utilized to resonate out (e.g., cancel out) loading capacitance from a load (e.g., a DAC driver, a transmitter circuit). In an aspect, the use of a T-coil may allow scaling down of the chain of clock distribution buffers. The scaling down of the chain of clock distribution buffers may allow for power saving and/or improved (e.g., reduced) phase noise. By way of non-limiting example, the scaling down the chain of clock distribution buffers may include reducing the number of clock buffers and/or the size of the clock buffers (e.g., size of transistors that form the clock buffers).

Figure 2:
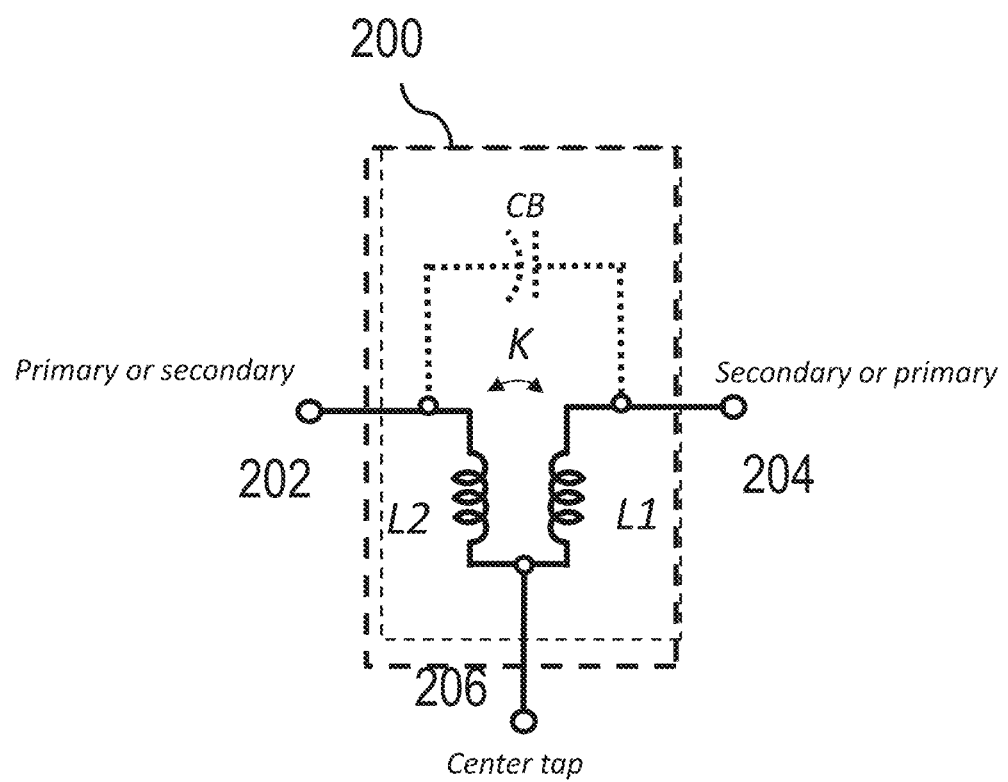
FIG. 2 illustrates an example of a T-coil.

FIG. 2 illustrates an example of a T-coil 200. The T-coil 200 is a three-terminal device. The terminals include a first (e.g., a primary) terminal 202, a second (e.g., secondary) terminal 204, and a center tap terminal 206 (e.g., a third terminal). The terms terminal and port are used interchangeably herein. In an aspect, the T-coil 200 includes an inductor that is center-tapped and includes portions with inductances L1 and L2. In an aspect, the T-coil 200 includes two inductors L1 and L2 (e.g., two overlapping inductors) that are connected with a center tap. The overlapping of the inductors L1 and L2 may allow for a more compact layout relative to a case in which two non-overlapping inductors are utilized. In an aspect, the T-coil 200 includes a bridge capacitor CB, which may arise due to electrical coupling between the primary port 202 and the secondary port 204 of the T-coil 200. In subsequent figures of the present disclosure, the bridge capacitor CB is not explicitly shown for the sake of simplicity. The primary and secondary ports 202 and 204 may be interchangeable if the inductance values of the two inductors L1 and L2 are equal in the design. The magnetic coupling factor K provides an inter-coupling between the inductors L1 and L2. The T-coil characteristics depend on the values of the inductances of inductors L1, L2, and the coupling factor K, which are based at least in part on the dimensions of the T-coil. In some implementations, the values of the inductances L1 and L2 are within a range of about 50 to 80 pico-Henry (pH), and the value of the bridge capacitor CB is within a range of about 5-10 femto-Farad (fF).

Figure 3:
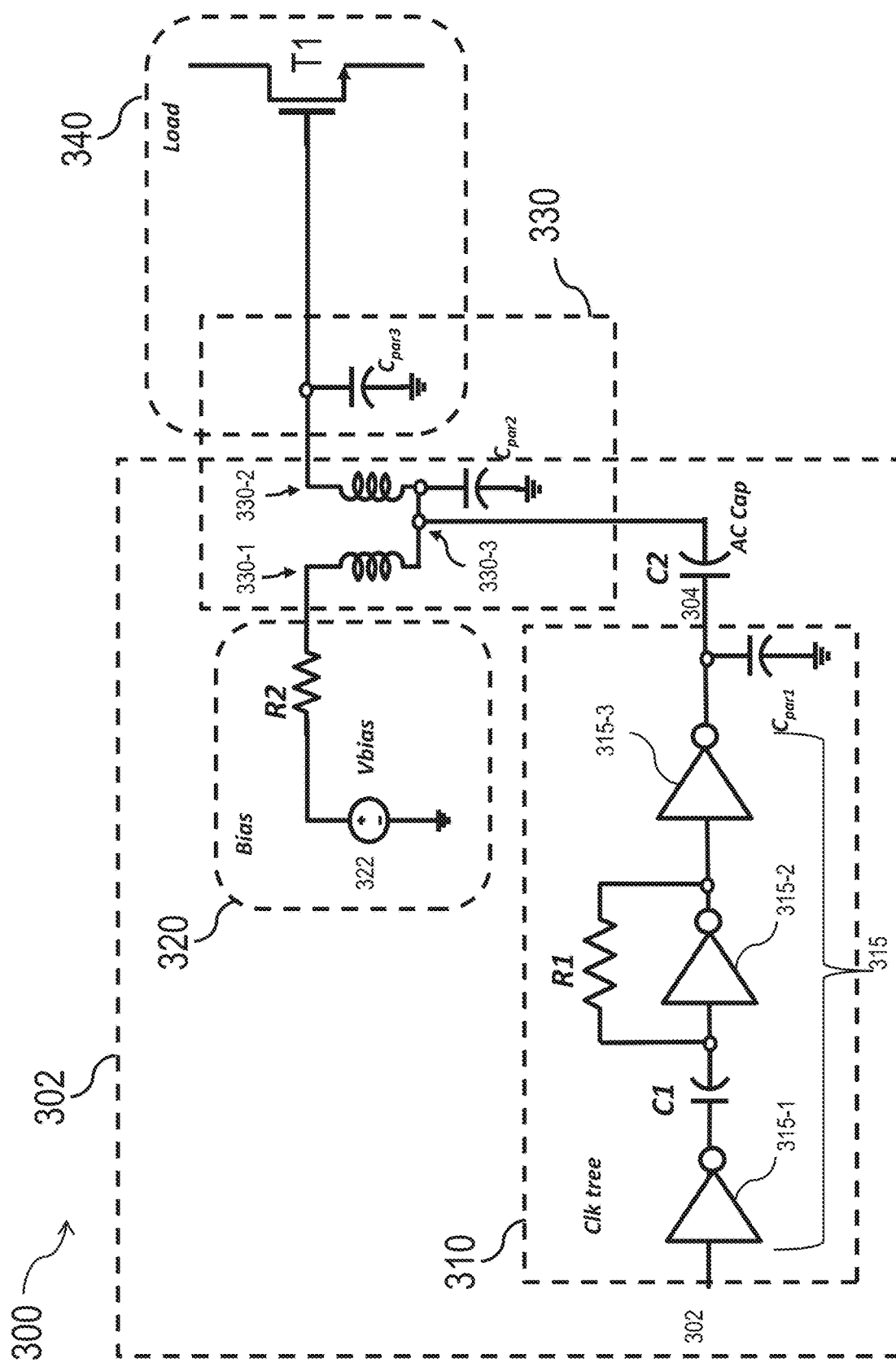
FIG. 3 illustrates an example of a circuit including a band-pass clock distribution network connected to a load.

FIG. 3 illustrates an example of a circuit 300 including a band-pass clock distribution network 302 connected to a load 340. The band-pass clock distribution network 302 may include a clock tree 310, a bias circuit 320, a T-coil 330, and a capacitor C2. In an aspect, the load 340 is tied to the secondary port 330-2 of the T-coil 330 and may include a DAC driver and/or a transmitter circuit.

The clock tree circuit 310 may include a series of cascaded clock buffers (e.g., inverters, non-inverting buffers) 315 (e.g., 315-1, 315-2, and 315-3). In an aspect, one or more of the clock buffers 315 may be utilized to allow for filtering of the clock signal 302 received by the clock tree circuit 310. In FIG. 3, the clock tree circuit 310 includes a capacitor C1 that is tied to an input port of a middle clock buffer 315-2 and a resistor R1 that is tied to the input port and an output port of the middle clock buffer 315-2. The capacitor C1 and the resistor R1 may form a part of the high-pass filter having a first high-pass pole P1 at 1/R1C1 (e.g., at about 1 GHz). In an aspect, the capacitor C1 may be referred to as an alternating current (AC) coupling capacitor and the resistor R1 may be referred to as a feedback resistor. In an aspect, alternatively or in addition, a capacitor and a resistor may be tied to another/other clock buffer(s) (e.g., 315-1 and/or 315-3) in a manner similar to how C1 and R1 are tied to the middle clock buffer 315-2.

The bias circuit 320 includes a resistor R2 and a voltage supply 322 for supplying a bias voltage Vbias (e.g., about 1 V) and is coupled to a primary port 330-1 of the T-coil 330. A capacitor C2 is coupled between an output node 304 of the clock tree circuit 310 and a center tap 303-3 of the T-coil 330. The capacitor C2 and the resistor R2 may form another portion of the high-pass filter having a second high-pass pole P2 at 1/R2C2 (e.g., at about 3 GHz). In an aspect, the capacitor C2 may be referred to as an AC coupling capacitor and the resistor R2 may be referred to as a biasing resistor. In an aspect, the T-coil 330 coupled with the capacitor C2 may allow for filtering characteristics that facilitate attenuation of out of band noise. In an aspect, the capacitors C1 and C2 may function as DC blocking capacitors. The capacitors C1 and C2 may reduce any duty-cycle distortion that may accumulate due to the buffers of the clock tree circuit 310.

The resistor R1 may be connected in a feedback configuration to set a direct current (DC) trip point of the middle clock buffer 315-2, which may further help restore the duty cycle. The second order high-pass corner may be formed by the poles P1 (at 1/R1C1) and P2 (at 1/R2C2). The high-pass corner may be set by adjusting the values of the passive components (e.g., R1, R2, C1, and C2). The T-coil 330 together with the load parasitic capacitor Cpar3 gives rise to a low-pass filter response. This low-pass filter, in conjunction with the high-pass filter, results in an overall band-pass response characteristic. In an aspect, the capacitor C1 and the resistor R1 may be tied to the middle clock buffer 315-2 to allow correction of duty cycle distortion and allow for larger signal (e.g., voltage) swing. In some aspects, the capacitor C1 and the resistor R1 as used in FIG. 3, permits usage of a DC trip point that allows stable operation, for instance, in applications that utilize the clock distribution network 302 over a range of temperatures to be endured by the clock distribution network 302 and/or a system containing the clock distribution network 302. For example, in a case with five clock buffers, a capacitor and a resistor may be tied to the third clock buffer.

The clock distribution network 302 may include parasitic capacitances Cpar1, Cpar2, and Cpar3. In an aspect, the parasitic capacitance Cpar1 is a parasitic capacitance associated with components of the clock tree circuit 310. In an aspect, the parasitic capacitance Cpar2 is a parasitic capacitance associated with the T-coil and the capacitor C2. In an aspect, the parasitic capacitance Cpar3 is a parasitic capacitance associated with the load 340. In an aspect, the parasitic capacitances Cpar1 and Cpar2 may be negligible compared to the parasitic capacitance Cpar3 (e.g., about 0.5 pF). The T-coil 330 and the parasitic capacitance Cpar3 associated with the load 340 may form a low-pass filter. The T-coil 330 may be utilized to resonate out the effects of the parasitic capacitance Cpar3.

In an aspect, the circuit 300 may allow phase noise improvement (e.g., up to about 10 dB) for clock distribution.

The T-coil 330 may be utilized to resonate out the presence of the relatively large parasitic capacitor Cpar3, which may result in reducing the number of clock buffers and/or reduce the size of the clock buffers driving the load 340. The reduction in the number and/or the size of the active devices that form the clock buffers 315 may improve the phase noise (e.g., jitter) of the clock tree circuit 310. In addition, the inductive behavior of the T-coil 330 may improve on the rising and falling edges of the clock signals and the amplitude of the clock signals, which may improve phase noise performance. In an aspect, the band-pass transfer characteristic of the circuit 300 may also attenuate any noise outside the band of the clock fundamental tone. In other words, the circuit 300 has band selective characteristic to filter out any out of band noise, thereby further improving the quality of the clocks to be distributed to the load 340.

Although the clock tree circuit 310 of FIG. 3 includes three inverter buffers, the clock tree circuit 310 may include fewer, more, and/or different buffers (e.g., repeaters). In an aspect, additional DC blocks may be cascaded to achieve a higher order high-pass filter. The higher order high-pass filter may allow further attenuation of low frequency noise. The additional DC blocks may be employed through adding additional clock buffer in the clock tree circuit 310. In some cases, increasing the number of clock buffers may cause utilization of higher power and/or worse phase noise (e.g., jitter).

Figure 4:
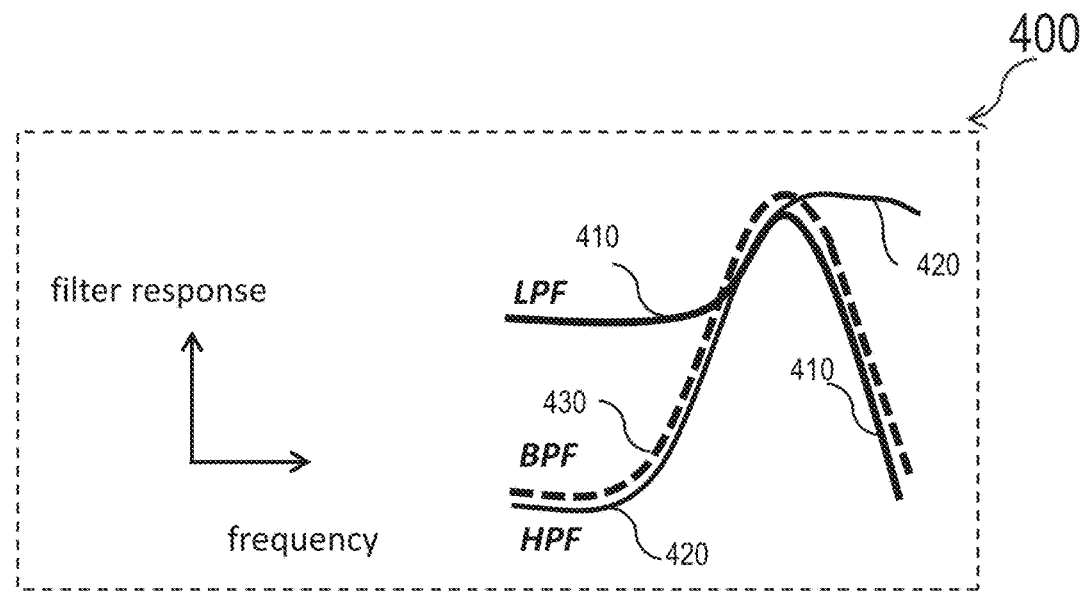
FIG. 4 illustrates an example of a graph of filter frequency responses as a function of frequency for the circuit shown in FIG. 3.

FIG. 4 illustrates an example of a graph 400 of filter frequency responses as a function of frequency for the circuit shown in FIG. 3. The filter frequency responses are a LPF response 410, a HPF response 420 and a BPF response 430. The LPF response 410 is caused by an LPF formed of the T-coil (e.g., 330 of FIG. 3) and the parasitic capacitance Cpar3 of FIG. 3. The HPF response 420 corresponds to the first HPF formed of the capacitor C1 and the resistor R1 of FIG. 3 and the second HPF formed of the capacitor C2 and the resistor R2 of FIG. 3. The BPF response 430 is formed from the combination (e.g., product) of the LPF response 410 and the HPF response 420. In an aspect, the center frequency of the BPF response 430 is within a range between about 20 GHz to about 30 GHz. In an aspect, the values of resistances R1 and R2, capacitances C1 and C2, and the characteristics (e.g., dimensions and values of L1, L2, K) of the T-coil may be adjusted to achieve a desired center frequency and passband. In some cases, one or more of the resistor R1, the resistor R2, the capacitor C1, and/or the capacitor C2 may be tunable, such that the associated resistances and/or capacitances may be tuned. For example, a capacitance of a tunable capacitor may be tuned based on a voltage applied to the tunable capacitor.

Figure 5:
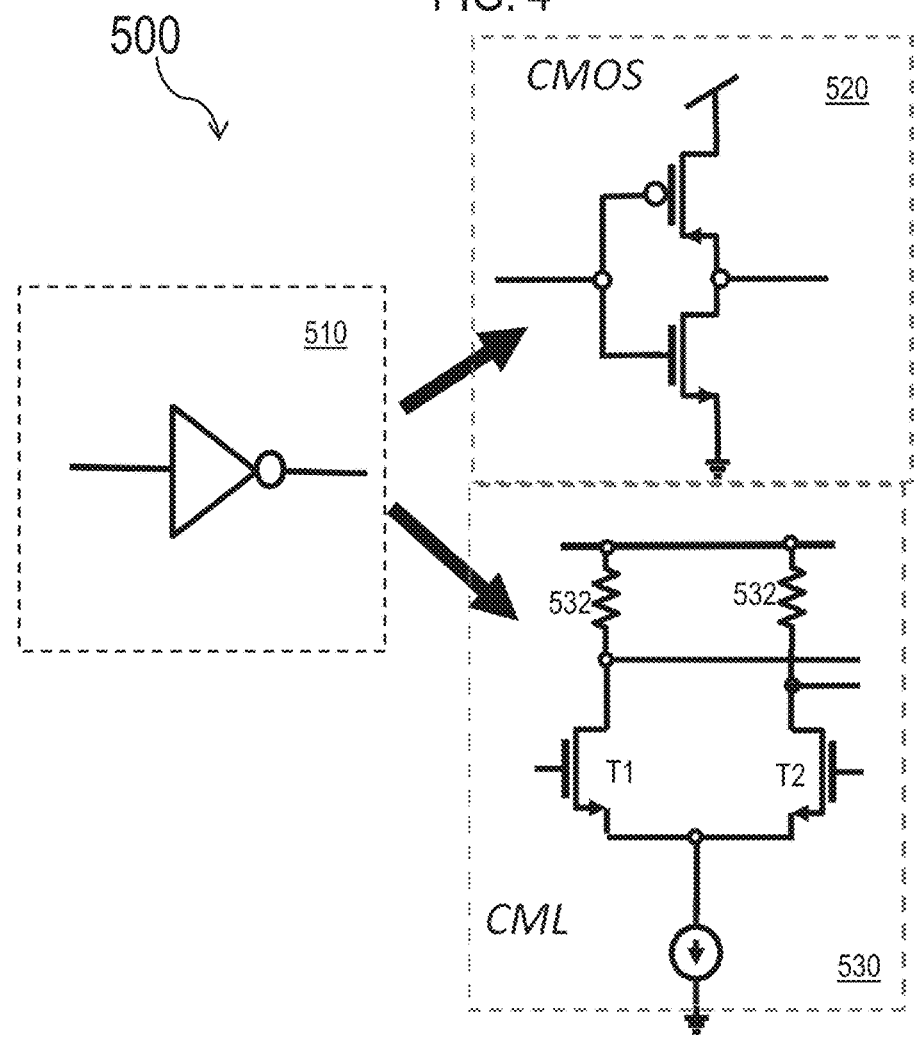
FIG. 5 illustrates example implementations of a clock buffer.
Figure 7:
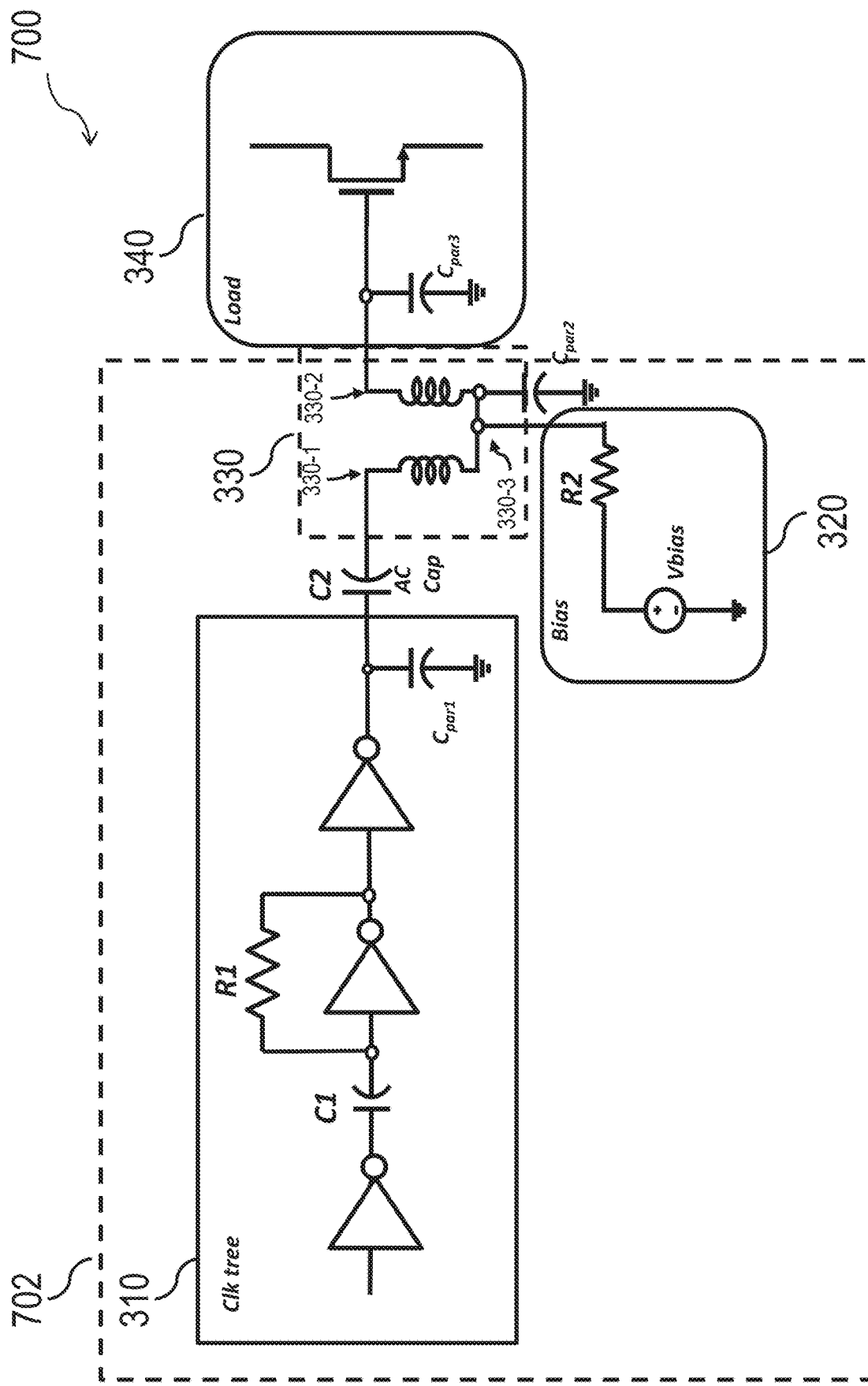
FIG. 7 illustrates an example of a circuit including a band-pass clock distribution network connected to a load.

FIG. 5 illustrates example implementations 520 and 530 of a clock buffer 510 (see, e.g., one or more clock buffers in FIGS. 1, 3 and 7). In an aspect, the clock distribution network (e.g., 302 of FIG. 3) may utilize CMOS-based levels (e.g., supply to ground swing), as shown in the implementation 520. In such an aspect, the clock buffers may be CMOS-based inverters or CMOS-based repeaters. In another aspect, the clock distribution network may utilize current mode logic (CML)-based levels, as shown in the implementation 530. The CML-based levels may utilize a swing that is less than a supply. The CML-based buffers may involve differential input and output. Thus, in the case that CML buffers are utilized, two T-coils may be utilized, one per each output of the differential output. In FIG. 5, the CML buffer implementation 530 includes resistors 532 tied to a supply on one end and transistors T1 and T2 on another end. In an aspect, the CML buffer may be implemented using a p-type MOS input with the resistors tied to ground instead of the supply. In an aspect, if the CML approach is utilized, the biasing resistor R2 of FIG. 3 should be set equal to the CML load resistor 532 for matching purposes. In an aspect, with reference to FIG. 3, a last stage of the clock tree circuit 310 may include a CML buffer. In such an aspect, the resistor R2 may be set equal to a load resistance (e.g., 532) associated with the CML buffer.

Figure 6:
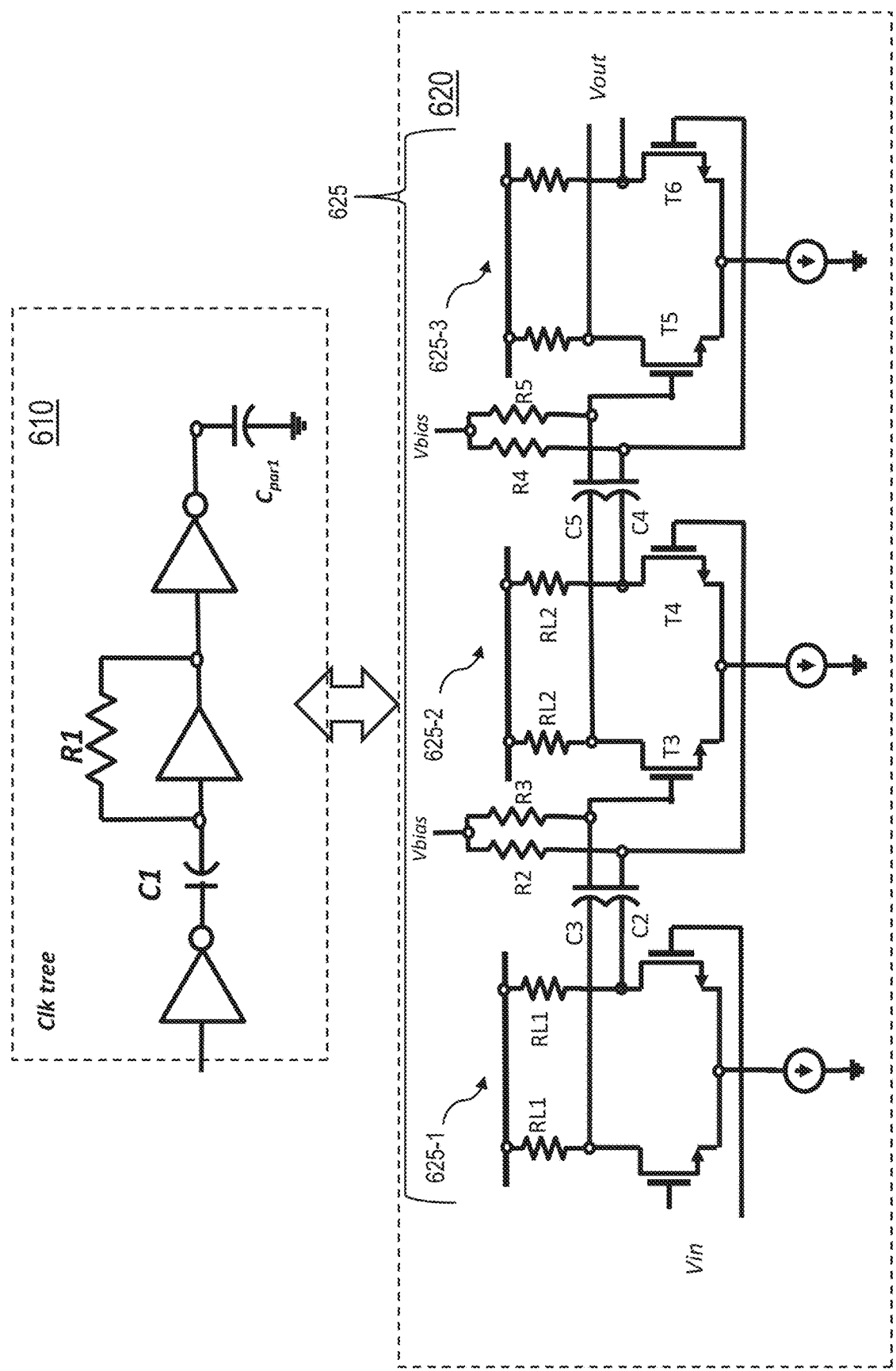
FIG. 6 illustrates an example of a clock tree along with a current-mode logic (CML) implementation.

FIG. 6 illustrates an example of a clock tree 610 along with a current-mode logic (CML) implementation 620. In an aspect, the clock distribution network 302 of FIG. 3 may be implemented using CML buffers 625 (e.g., 625-1, 625-2, and 625-3). In an aspect, a CML-based clock tree does not utilize the resistor R1 and the capacitor C1 of FIG. 3 due to the differential configuration associated with the CML-based clock tree. The differential configuration may allow reduction or avoidance of duty cycle distortion. The bias resistors R2 and R3 of transistors T4 and T3 are tied to the bias voltages Vbias and through coupling capacitors C2 and C3 to output nodes of the CML buffer 625-1. The values of the resistors R2 and R3 can be set equal to a load resistance ($R_{L1}$) associated with the CML-based buffer 625-1 for impedance matching purposes. The bias resistors R4 and R5 of transistors T6 and T5 are tied to the bias voltages Vbias and through coupling capacitors C4 and C5 to output nodes of the CML buffer 625-2. The values of the resistors R4 and R5 can be set equal to a load resistance ($R_{L2}$) associated with the CML-based buffer 625-2 for impedance matching purposes.

FIG. 7 illustrates an example of a circuit 700 including a band-pass clock distribution network 702 connected to a load 340. The description from FIG. 3 generally applies to FIG. 7, with examples of differences between FIG. 3 and FIG. 7 and other description provided herein for purposes of clarity and simplicity. The band-pass clock distribution network 702 includes the clock tree circuit 310, the bias circuit 320, the T-coil 330, and the capacitor C2. The clock tree circuit 310 may be applied to either the primary port 330-1 or the secondary port 330-2 of the T-coil 330 (rather than the center tap 330-3) and the load 340 may be tied to the other port of the T-coil 330. The bias circuit 320 may be tied to the center-tap 330-3 of the T-coil 330.

In one or more aspects, each of the three terminals/ports of a T-coil (e.g., 202, 204 and 206 in FIGS. 2; 330-1, 330-2 and 330-3 in FIG. 3; and 330-1, 330-2 and 330-3 in FIG. 7) may be referred to as a first terminal, a second terminal, or a third terminal, in any order in a number of different ways. For example, the 330-1, 330-3, and 330-2 terminals may be referred to as a first terminal, a second terminal, and a third terminal, respectively. In another example, the 330-3, 330-1, and 330-2 terminals may be referred to as a first terminal, a second terminal, and a third terminal, respectively. These are merely examples, and the reference (e.g., first, second, third) to a terminal may be provided in any order.

Figure 8:
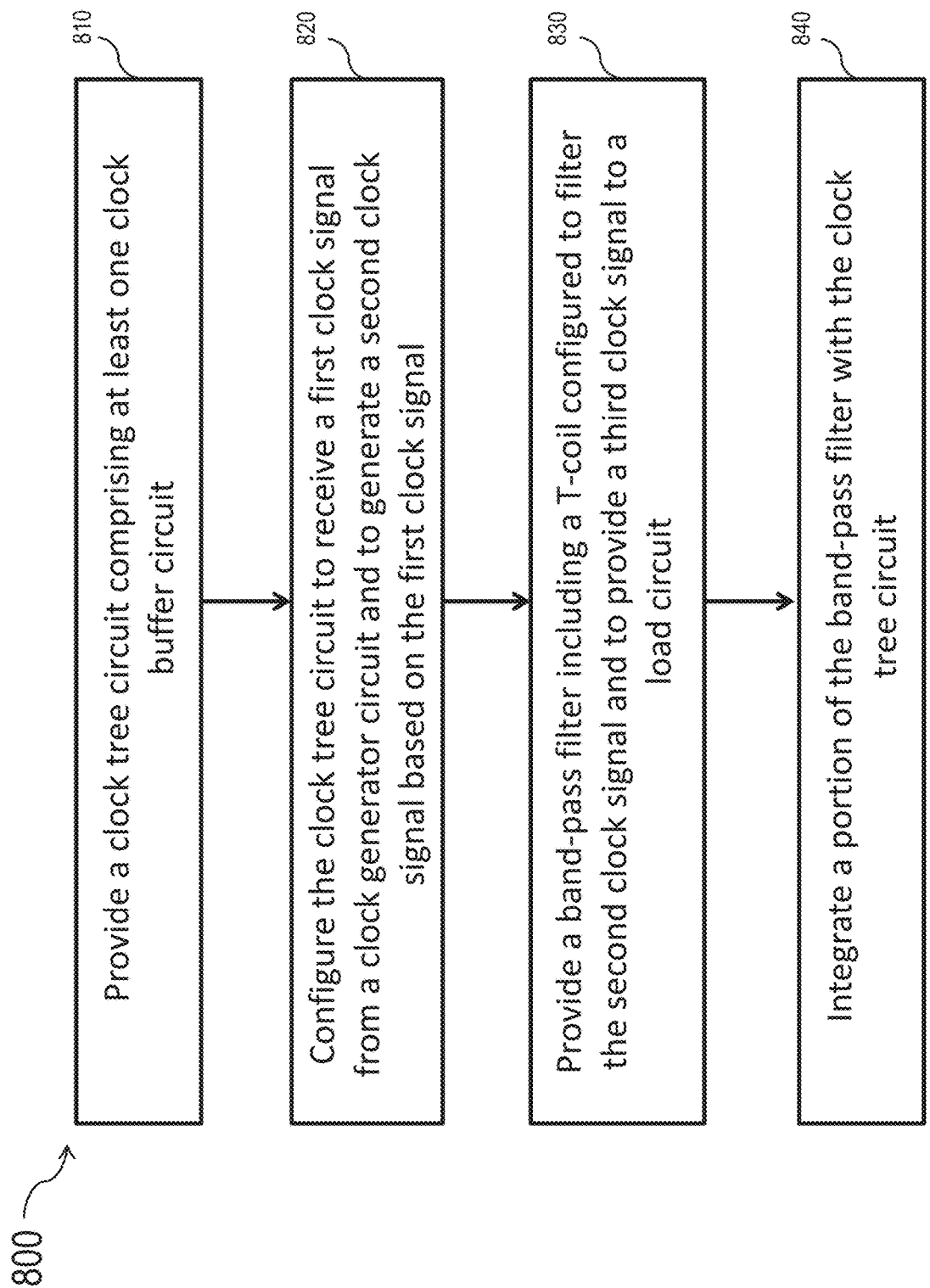
FIG. 8 illustrates an example of a method for providing a band-pass clock distribution networks.

FIG. 8 illustrates an example of a method 800 for providing a band-pass clock distribution network (e.g., 110 of FIG. 1 or 302 of FIG. 3). The method 800 includes providing a clock tree circuit (e.g., 310 of FIG. 3) that includes at least one clock buffer circuit (e.g., 315 of FIG. 3) (810). The clock tree circuit may be configured to receive a first clock signal (e.g., 302 of FIG. 3) from a clock generator circuit and to generate a second clock signal (e.g., 304 of FIG. 3) based on the first clock signal (820). A band-pass filter (e.g., 114 of FIG. 1) including a T-coil (e.g., 200 of FIG. 2) may be configured to filter the second clock signal and to provide a third clock signal to a load circuit (e.g., 340 of FIG. 3) (830). A portion of the band-pass filter (e.g., R1 and C1 of FIG. 3)

may be integrated with the clock tree circuit (840). The T-coil includes a pair of coupled inductors (e.g., L1 and L2 of FIG. 2) sharing a center tap (e.g., 206 of FIG. 2) and is configurable to resonate out an effect of parasitic capacitances (e.g., Cpar3 of FIG. 3) associated with the load circuit. The portion of the band-pass filter integrated with the clock tree circuit is a first part of a high-pass filter (e.g., 122 of FIG. 1).

Various examples of aspects of the disclosure are described below as clauses for convenience. These are provided as examples, and do not limit the subject technology.

Clause A. A band-pass clock distribution circuit, the circuit comprising: a clock tree circuit comprising at least one clock buffer circuit, the clock tree circuit being configured to receive a first clock signal and to generate a second clock signal based on the first clock signal; and a band-pass filter configured to receive the second clock signal and to provide a third clock signal to one or more load circuits, wherein: the band-pass filter comprises a filtering resonant network including a first inductor and a second inductor coupled to one another at a center tap and is configurable to resonate with a parasitic capacitance associated with the one or more load circuits, and a portion of the band-pass filter is integrated with the clock tree circuit.

Clause B. A method for providing a band-pass clock distribution circuit, the method comprising: providing a clock tree circuit comprising at least one clock buffer circuit; configuring the clock tree circuit to receive a first clock signal and to generate a second clock signal based on the first clock signal; providing a band-pass filter including a T-coil configured to filter the second clock signal and to provide a third clock signal to a load circuit; and integrating a portion of the band-pass filter with the clock tree circuit, wherein: the T-coil includes a pair of coupled inductors sharing a center tap and is configurable to resonate out an effect of parasitic capacitances associated with the load circuit, and the portion of the band-pass filter integrated with the clock tree circuit is a first high-pass filter.

Clause C. A band-pass clock distribution circuit, the circuit comprising: a clock tree circuit comprising at least one inverter circuit, the clock tree circuit is configured to receive a first clock signal and to provide a second clock signal; a filtering resonant network configured to process the second clock signal to provide a third clock signal to a load circuit and to cancel out an effect of parasitic capacitances associated with the load circuit by providing an inductance that resonates with the parasitic capacitance associated with the load circuit; and a bias circuit including a resistor coupled to a first terminal of the filtering resonant network, wherein: a second terminal of the filtering resonant network is coupled via a coupling capacitor to an output node of the clock tree circuit, and a third terminal of the filtering resonant network is coupled to the load circuit.

In one or more aspects, examples of additional clauses are described below.

A method comprising one or more methods, operations or portions thereof described herein.

An apparatus comprising means adapted for performing one or more methods, operations or portions thereof described herein.

A hardware apparatus comprising circuits configured to perform one or more methods, operations or portions thereof described herein.

An apparatus comprising means adapted for performing one or more methods, operations or portions thereof described herein.

An apparatus comprising components operable to carry out one or more methods, operations or portions thereof described herein.

In one aspect, a method may be an operation, an instruction, or a function and vice versa. In one aspect, a clause may be amended to include some or all of the words (e.g., instructions, operations, functions, or components) recited in other one or more clauses, one or more words, one or more sentences, one or more phrases, one or more paragraphs, and/or one or more claims. During prosecution, one or more claims may be amended to depend on one or more other claims, and one or more claims may be amended to delete one or more limitations.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

In one aspect, a transistor may be a bipolar junction transistor (BJT), and it may refer to any of a variety of multi-terminal transistors generally operating on the principal of carrying current using both electrons and holes, including but not limited to an n-p-n BJT and a p-n-p BJT.

In one aspect, a transistor may be a field effect transistor (FET), and it may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

In one aspect, the terms base, emitter, and collector may refer to three terminals of a transistor and may refer to a base, an emitter and a collector of a bipolar junction transistor or may refer to a gate, a source, and a drain of a field effect transistor, respectively, and vice versa. In another aspect, the terms gate, source, and drain may refer to base, emitter, and collector of a transistor, respectively, and vice versa.

Unless otherwise mentioned, various configurations described in the present disclosure may be implemented on a Silicon, Silicon-Germanium (SiGe), Gallium Arsenide (GaAs), Indium Phosphide (InP) or Indium Gallium Phosphide (InGaP) substrate, or any other suitable substrate.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A clock distribution circuit, comprising:
   a clock tree circuit comprising at least one clock buffer circuit, the clock tree circuit being configured to receive a first clock signal and to generate a second clock signal based on the first clock signal; and
   a low-pass filter configured to receive the second clock signal and to provide a third clock signal to one or more load circuits,
   wherein:
   the low-pass filter comprises a filtering resonant network including a first inductor and a second inductor coupled to one another at a center tap and is configurable to resonate with parasitic capacitance associated with the one or more load circuits;
   a first high-pass filter is integrated with the clock tree circuit;
   the at least one clock buffer circuit comprises a first buffer circuit that is within an inner portion of the clock tree circuit; and
   the first high-pass filter is within the inner portion of the clock tree circuit and is directly coupled to the first buffer circuit within the inner portion of the clock tree circuit.

2. The clock distribution circuit of claim 1, wherein the at least one clock buffer circuit comprises at least one inverter, wherein the inverter comprises a complementary metal-oxide semiconductor (CMOS) inverter, wherein the clock tree circuit comprises a cascade of inverter circuits, and wherein the clock tree circuit comprises three inverter circuits.

3. The clock distribution circuit of claim 1, wherein the clock tree circuit comprises three clock buffer circuits, and the first high-pass filter is integrated with a middle one of the three clock buffer circuits.

4. The clock distribution circuit of claim 1, wherein a band-pass filter comprises a high-pass filter in series with the low-pass filter, wherein the high-pass filter is implemented using the first high-pass filter integrated with the clock tree circuit and a second high-pass filter.

5. The clock distribution circuit of claim 1, wherein a band-pass filter comprises a high-pass filter in series with the low-pass filter, wherein the high-pass filter comprises a second high-pass filter including a series capacitor and a resistor associated with a bias circuit, and wherein the series capacitor is coupled between an output node of the clock tree circuit and the center tap of the filtering resonant network.

6. The clock distribution circuit of claim 1, further comprising a bias circuit coupled to a first terminal of the filtering resonant network, wherein the bias circuit includes a resistor and a bias supply voltage terminal coupled to the resistor.

7. The clock distribution circuit of claim 1, wherein the filtering resonant network comprises a T-coil, and wherein the filtering resonant network comprises a first terminal coupled to a bias circuit and a second terminal coupled to the one or more load circuits.

8. The clock distribution circuit of claim 1, wherein the at least one clock buffer circuit comprises one or more inverter circuits, and wherein the one or more inverter circuits comprises one or more current-mode logic (CML) inverter circuits.

9. The clock distribution circuit of claim 1, wherein the at least one clock buffer circuit comprises three cascaded CML inverters including a first CML inverter, a second CML inverter, and a third CML inverter, and wherein output nodes of the first and the second CML inverters are respectively coupled to input bias circuits of the second and the third CML inverters.

10. The clock distribution circuit of claim 1, wherein the filtering resonant network is configured to cancel out an effect of capacitive load associated with the parasitic capacitance of the one or more load circuits and thereby allowing reduced power consumption by the clock tree circuit and an improvement of up to about 10 dB in an associated phase noise.

11. A method for providing a clock distribution circuit, the method comprising:
providing a clock tree circuit comprising at least one clock buffer circuit;
configuring the clock tree circuit to receive a first clock signal and to generate a second clock signal based on the first clock signal;
providing a low-pass filter including a T-coil configured to filter the second clock signal and to provide a third clock signal to a load circuit; and
integrating a first high-pass filter with the clock tree circuit,
wherein:
the T-coil includes a pair of coupled inductors sharing a center tap and is configurable to resonate out an effect of parasitic capacitance associated with the load circuit;
the at least one clock buffer circuit comprises a first buffer circuit that is within an inner portion of the clock tree circuit; and
the first high-pass filter is within the inner portion of the clock tree circuit and is directly coupled to the first buffer circuit within the inner portion of the clock tree circuit.

12. The method of claim 11, wherein the at least one clock buffer circuit comprises at least one CMOS inverter, and wherein the clock tree circuit comprises three clock buffer circuits.

13. The method of claim 11, comprising providing a band-pass filter, wherein providing the band-pass filter comprise providing a high-pass filter in series with the low-pass filter, wherein the high-pass filter comprises a second high-pass filter including a series capacitor and a resistor associated with a bias circuit.

14. The method of claim 13, further comprising coupling the series capacitor between an output node of the clock tree circuit and the center tap of the T-coil.

15. The method of claim 11, further comprising coupling a bias circuit to a first terminal of the T-coil, wherein the bias circuit includes a resistor and a bias supply voltage terminal coupled to the resistor.

16. The method of claim 11, further comprising coupling a first terminal of the T-coil to a bias circuit and a second terminal of the T-coil coupled to the load circuit.

17. The method of claim 11, wherein providing the clock tree circuit comprises providing one or more current-mode logic (CML) inverters, wherein the one or more CML inverters comprises three cascaded CML inverters including a first CML inverter, a second CML inverter, and a third CML inverter, and wherein the method further comprises coupling output nodes of the first and the second CML inverters respectively to input bias circuits of the second and the third CML inverters.

18. The method of claim 11, wherein the load circuit comprises one or more load circuits, and wherein the T-coil is configured to resonate out an effect of parasitic capacitance associated with the one or more load circuits and thereby allowing reduced power consumption by the clock tree circuit and an improvement of up to about 10 dB in an associated phase noise.

19. A clock distribution circuit, comprising:
a clock tree circuit comprising at least one inverter circuit, the clock tree circuit is configured to receive a first clock signal and to provide a second clock signal;
a low-pass filter comprising a filtering resonant network, wherein the filtering resonant network is configured to process the second clock signal to provide a third clock signal to a load circuit and to cancel out an effect of parasitic capacitance associated with the load circuit by providing an inductance that resonates with the parasitic capacitance associated with the load circuit; and
a bias circuit including a resistor coupled to a first terminal of the filtering resonant network,
wherein:
a second terminal of the filtering resonant network is coupled via a coupling capacitor to an output node of the clock tree circuit;
a third terminal of the filtering resonant network is coupled to the load circuit;
a first high-pass filter is integrated with the clock tree circuit;
the at least one inverter circuit comprises a first inverter circuit that is within an inner portion of the clock tree circuit; and
the first high-pass filter is within the inner portion of the clock tree circuit and is directly coupled to the first inverter circuit within the inner portion of the clock tree circuit.

20. The clock distribution circuit of claim 19, comprising a band-pass filter, wherein the band-pass filter comprises the low-pass filter and the first high-pass filter, wherein the first high-pass filter is at least partially integrated with the at least one inverter circuit of the clock tree circuit, wherein the at least one inverter circuit comprises a complementary metal-oxide semiconductor (CMOS) inverter circuit or a CML inverter circuit, and wherein the filtering resonant network comprises a T-coil.

* * * * *